United States Patent [19]

Hoernig

[11] Patent Number: 5,685,515

[45] Date of Patent: Nov. 11, 1997

[54] MIRROR TILT MECHANISM

[75] Inventor: Victor Hoernig, Lowell, Ind.

[73] Assignee: Kasa, Inc., Lowell, Ind.

[21] Appl. No.: 471,082

[22] Filed: Jun. 6, 1995

[51] Int. Cl.$^6$ ..................................................... A47G 1/24
[52] U.S. Cl. ........................................... 248/486; 359/871
[58] Field of Search ................................. 248/475.1, 476, 248/479, 489, 494, 495, 222.52, 224.8, 291.1, 486; 359/871, 872, 838

[56] References Cited

U.S. PATENT DOCUMENTS

| | | | |
|---|---|---|---|
| 710,235 | 9/1902 | Allen | 248/476 |
| 2,139,596 | 12/1938 | Luppert | 248/486 |
| 2,923,506 | 2/1960 | Simons | 248/486 |
| 3,332,731 | 7/1967 | Penk | 359/872 |
| 4,602,855 | 7/1986 | Frey | 248/476 X |
| 5,154,382 | 10/1992 | Hoshino | 248/291.1 X |

FOREIGN PATENT DOCUMENTS 681136  1/1993  Switzerland ........................... 248/476

Primary Examiner—Ramon O. Ramirez
Attorney, Agent, or Firm—Curtis, Morris & Safford

[57] ABSTRACT

A mirror tilt mechanism is provided for tilting a mirror assembly to a predetermined angle with respect to a vertical axis of the wall surface upon a relatively minor force being placed on the bottom portion of the mirror assembly. This mirror tilt mechanism includes a bracket member for mounting the mirror tilt mechanism to the wall surface and an arm member for engaging the mirror assembly to be tilted. This arm member is pivotally mounted to the bracket member such that the arm member is pivotally movable between a first position, wherein the mirror is supported in a generally vertical orientation with respect to the vertical axis of the wall surface, and a second position, wherein the mirror is supported at a predetermined angle with respect to the vertical angle of the wall surface such that the mirror is angled generally downwardly. In this manner, the mirror is "accessible" for use by handicapped individuals.

13 Claims, 4 Drawing Sheets

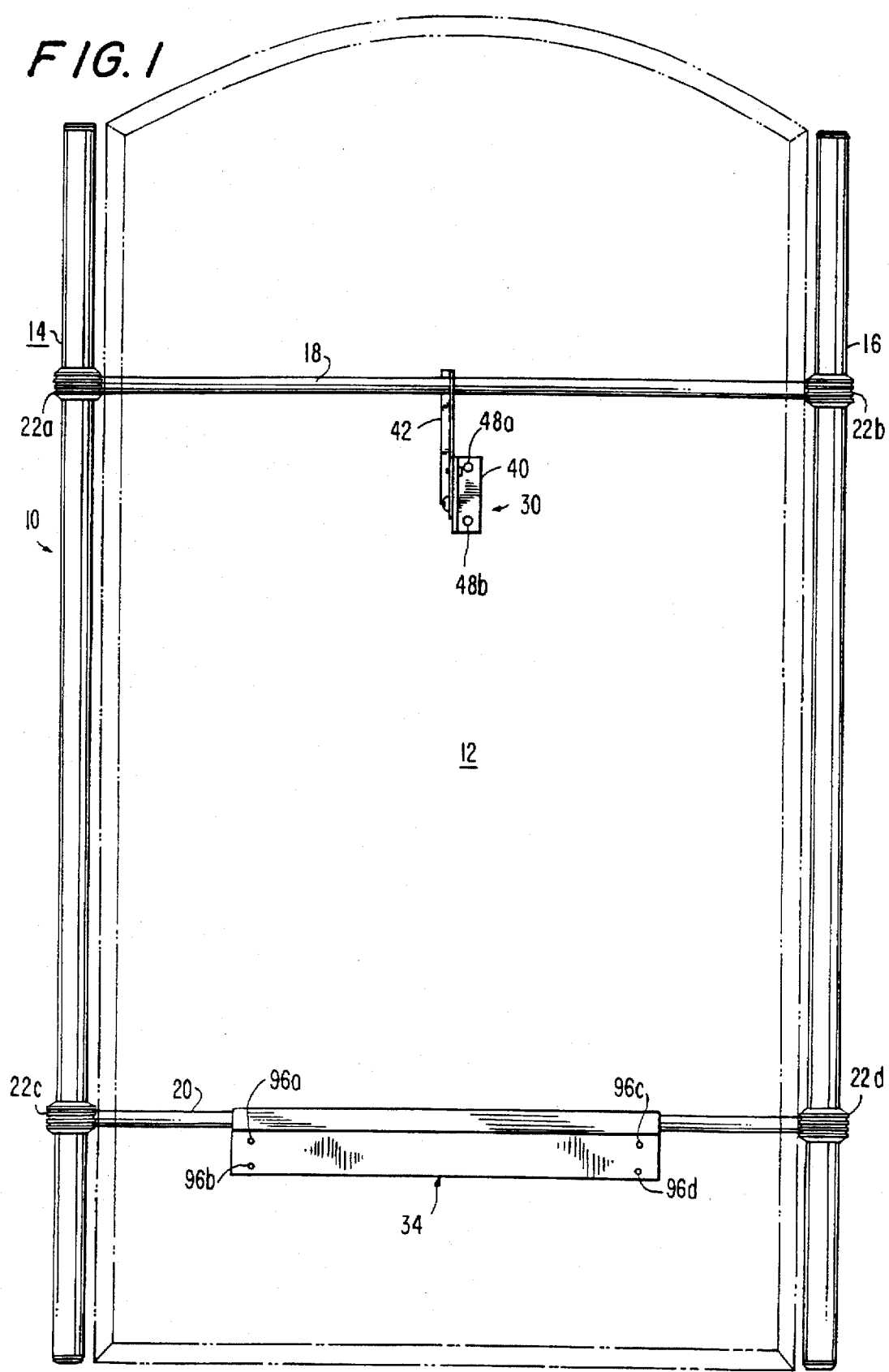

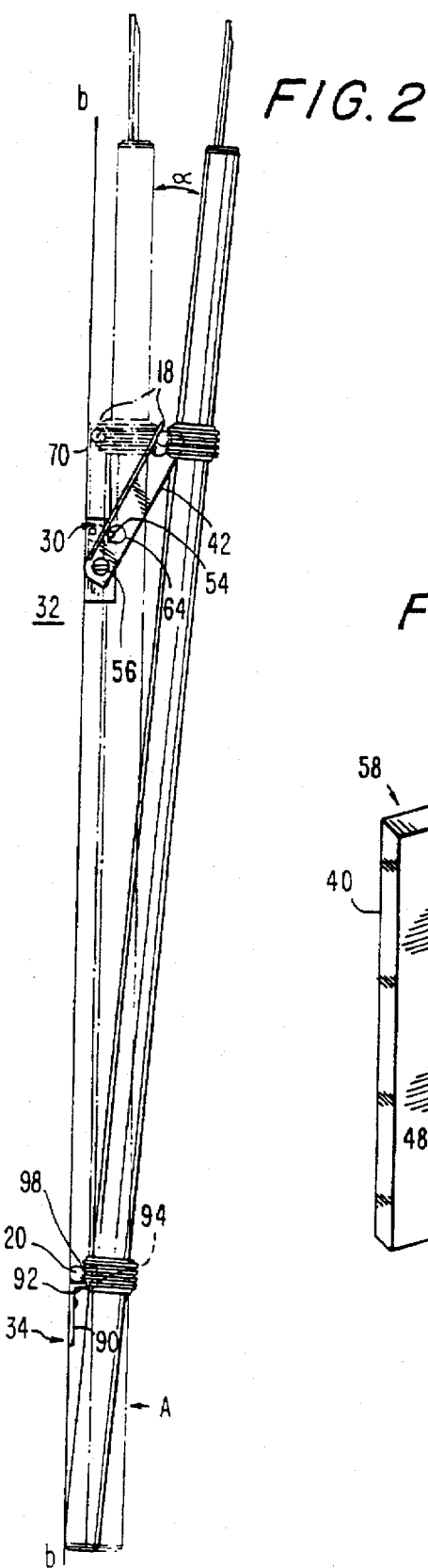
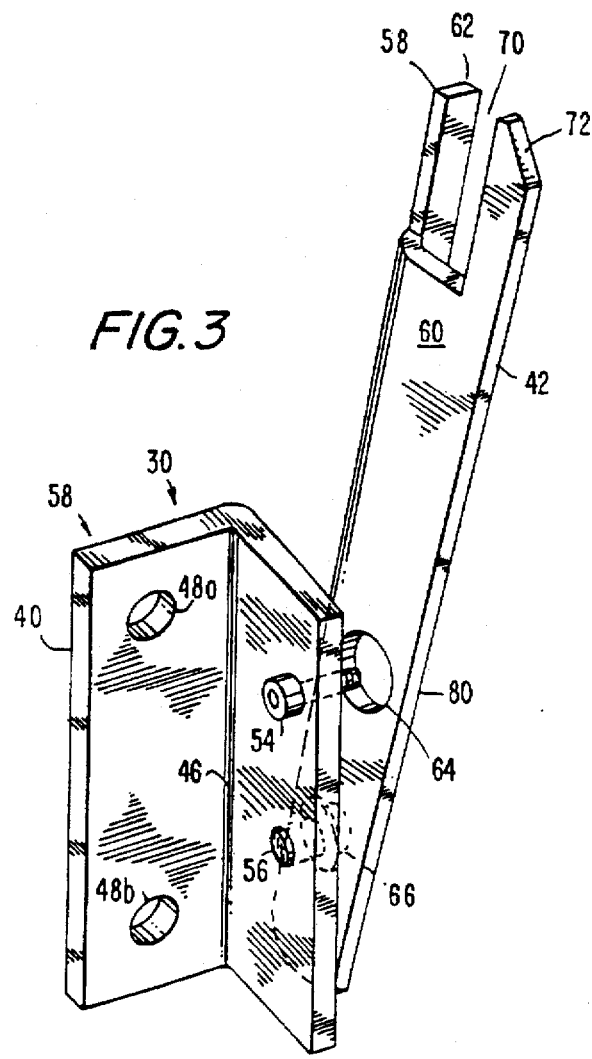

5,685,515

MIRROR TILT MECHANISM

FIELD OF THE INVENTION

This invention relates to a bracket assembly, and more particularly, this invention relates to a mirror tilt mechanism for tilting a mirror assembly to a predetermined angle with respect to a vertical axis of a wall surface.

BACKGROUND OF THE INVENTION

Typically, in bathrooms, mirrors are either rigidly mounted to the wall surface or contained as part of a vanity such that the mirror is fixed in a generally vertical orientation with respect to the vertical axis of the bathroom wall surface. However, with the advent of federal, state and local regulations regarding rights of the handicapped, such as the American with Disabilities Act, "accessibility" of bathroom fixtures for use by the handicapped is of great importance, especially in public settings. In lieu thereof, it has been found desirable to provide a mechanism which allows the bathroom mirror to be easily tilted at a predetermined angle generally downwardly with respect to the vertical axis of the wall surface such that it is accessible for use by handicapped individuals.

In the past, in order to provide a pivotally tiltable mirror, typically, the mirror assembly has included two knobs extending outwardly from the side edges thereof. These knobs fit into generally U-shaped slots provided at the ends of upwardly extending arms of a support assembly. In order to pivotally tilt these mirrors, either the upper or lower portion of the mirror is pushed forwardly or rearwardly to obtain the desired mirror angle. These mirrors have been found disadvantageous, especially in public places, as the pivotal angular movement of the mirror is not restricted thereby leading to potential breakage of the mirror due to accidental contact of the mirror assembly with another surface as well as inconvenience in terms of the user maintaining the mirror assembly at the desired angle. Moreover, these mirror assemblies are not practical for use in bathroom settings. It has therefore been found desirable to provide a tilting mechanism for bathroom mirrors which allow the bottom portion of the mirror to be pushed inwardly such that pivotal angular movement of the mirror is restricted to thereby minimize the possible attendant chances of mirror breakage while at the same time retaining the mirror in the proper angular position.

OBJECTS OF THE INVENTION

Therefore, it is an object of the present invention to provide a tilting mechanism for a mirror assembly which avoids the aforementioned disadvantages of the prior art.

An additional object of the present invention is to provide a tilting mechanism for a mirror assembly which permits the mirror assembly to be supported at a predetermined angle with respect to the vertical axis of the wall surface such that the mirror is angled generally downwardly.

Another object of the invention is to provide a tilting mechanism for a bathroom mirror assembly which makes the mirror "accessible" for use by handicapped individuals.

A further object of this invention is to provide a tilting mechanism for a mirror assembly which restricts forward and rearward pivotal movement of the mirror assembly and retains the mirror assembly reliably in its predetermined angular position.

Various other objects, advantages and features of the present invention will become readily apparent from the ensuing detailed description and the novel features will be particularly pointed out in the appended claims.

SUMMARY OF THE INVENTION

In accordance with the present invention, a mirror tilt mechanism is provided for pivotally moving a mirror assembly to a predetermined angle with respect to the vertical axis of the wall surface upon a force being applied to the lower portion of the mirror assembly. This mirror assembly includes the mirror to be tilted and at least two vertical support members interconnected by upper and lower horizontal members which support the mirror.

The mirror tilt mechanism includes a bracket member for mounting the mirror tilt mechanism of the present invention to the wall surface and an arm member having a slot member provided therein for engaging of the upper horizontal member of the mirror assembly to be tilted. In addition, a flange support member is mounted to the wall surface which supports the lower horizontal support member of the mirror assembly.

In accordance with one of the general objects of the present invention, the arm member of the mirror tilt mechanism of the present invention is pivotally mounted to the bracket member such that the arm member is pivotally movable between a first position, wherein the mirror assembly is supported in a generally vertical orientation with respect to the vertical axis of the wall surface, and a second position, wherein the mirror assembly is supported at a predetermined angle with respect to the vertical axis of the wall surface such that the mirror is angled generally downwardly. A relatively minor force applied to the lower portion of the mirror assembly is all that is required to pivot the arm member between its first and second positions. In this second position with the mirror angled generally downwardly, the mirror is "accessible" for use by a handicapped individual.

In order to limit the forward and rearward pivotal movement of the arm member of the mirror tilt mechanism of the present invention, a pivot limiting member for limiting pivotal movement of the arm member between its first and second extended positions is provided. This pivot limiting member includes a pin member extending from the bracket member which passes through an enclosure member provided in the arm member. This enclosure member is preferably a generally circular opening which has a first stop surface, which restricts further rearward movement of the arm member when the pin member impinges thereupon to thereby retain the arm member in its first position, and a second stop surface, which restricts further forward movement of the arm member when the pin member impinges thereupon to thereby retain the arm member in its second position.

BRIEF DESCRIPTION OF THE DRAWINGS

The following detailed description, given by way of example, will best be understood in conjunction with the accompanying drawings in which:

FIG. 1 is a rear elevational view of a preferred embodiment of a mirror tilt mechanism in accordance with the teachings of the present invention specifically illustrating the mirror tilt mechanism engaging a mirror assembly to be tilted.

FIG. 2 is a side elevational view of the mirror tilt mechanism engaging the mirror assembly of FIG. 1 and specifically illustrating the arm member of the mirror tilt mechanism being pivotally moved between a first position, wherein the mirror is supported in a generally vertical orientation with respect to the vertical axis of the wall surface, and a second position, wherein the mirror is supported at a predetermined angle with respect to the vertical axis of the wall surface such that the mirror is angled generally downwardly.

FIG. 3 is an enlarged front perspective view of a preferred embodiment of the mirror tilt mechanism in accordance with the teachings of the present invention shown in FIGS. 1 and 2.

DETAILED DESCRIPTION OF A PREFERRED EMBODIMENT

Figure 4:
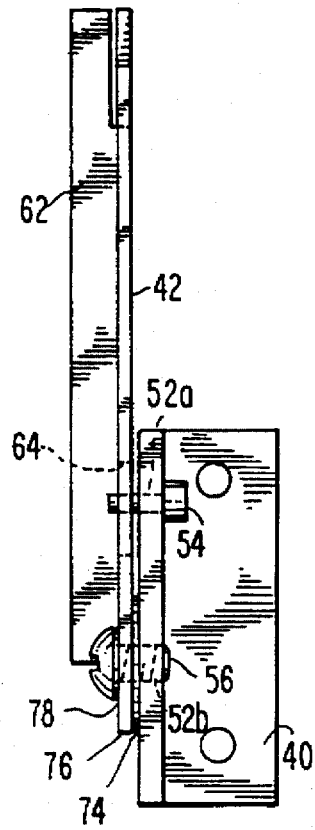
FIG. 4 is a side elevational view of the mirror tilt mechanism of FIG. 3.

Referring now to the drawings, wherein like reference numerals are used throughout and in particular to FIGS. 1 and 2, there is illustrated a preferred embodiment of a mirror tilt mechanism for pivotally moving a mirror assembly to a predetermined angle with respect to the vertical axis of a wall system in accordance with the present invention. This system is designed such that bathroom mirrors are accessible for use by handicapped individuals.

As is shown in FIGS. 1 and 2, a mirror assembly 10 supporting a mirror 12 (rear facing portion thereof shown) is comprised of two vertical support legs or members 14 and 16 which are interconnected by upper and lower horizontal support members 18 and 20, respectively, by means of expansion joints 22a, 22b, 22c and 22d. As will be described in further detail below, the upper horizontal support member 18 of the mirror assembly is engaged with a mirror tilt mechanism 30 which is mounted to the wall surface 32. The lower horizontal support member 20 is supported by a flange support member 34 which is also mounted to the wall surface 32.

As a result of the construction of this assembly, when the bottom portion of the mirror assembly is pushed inwardly with a relatively minor force in the direction of arrow A in FIG. 2, the mirror is pivotally movable between a first position, wherein the mirror assembly is supported in a generally vertical orientation with respect to the vertical axis b—b of the wall surface 32, and a second position, wherein the mirror assembly is supported at a predetermined angle α with respect to the vertical axis b—b of the wall surface such that the mirror is angled generally downwardly.

Figure 5:
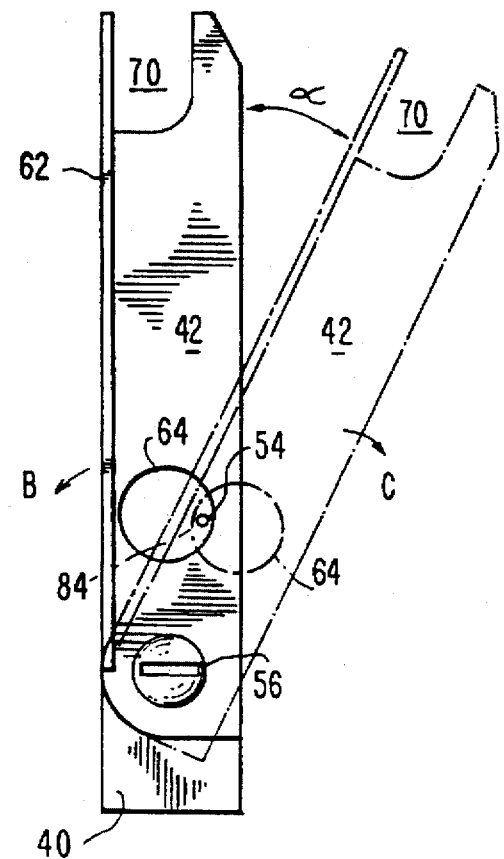
FIG. 5 is another side elevational view of the mirror tilt mechanism of FIG. 3 specifically illustrating the arm member of the mirror tilt mechanism being pivotally moved between the first and second positions shown in FIG. 2.
Figure 6:
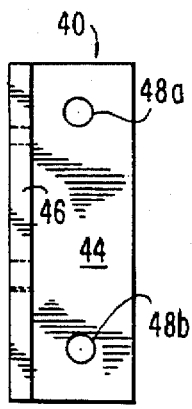
FIG. 6 is a rear elevational view of the bracket member of the mirror tilt mechanism of FIG. 3.
Figure 8:
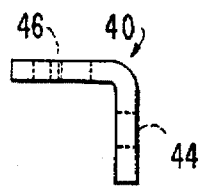
FIG. 8 is a top plan view of the bracket member of the mirror tilt mechanism of FIG. 3.
Figure 9:
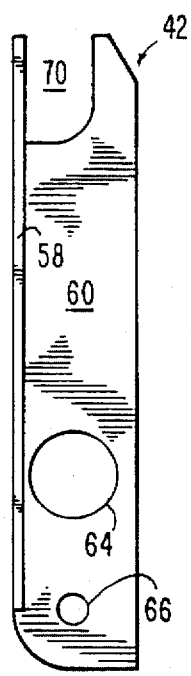
FIG. 9 is a side elevational view of the arm member of the mirror tilt assembly of FIG. 3.
Figure 10:
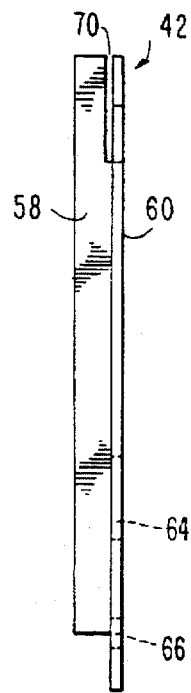
FIG. 10 is a rear elevational view of the arm member of the mirror tilt mechanism of FIG. 3.

As is best shown in FIGS. 3 through 5, the mirror tilt mechanism 30 of the present invention is comprised of a bracket member 40 and an arm member 42. The bracket member 40 is generally L-shaped and includes a first mounting surface or member 44 and a second extension surface or plate 46 extending outwardly from the first mounting surface 44 at approximately a right angle (see FIG. 8). The vertically extending mounting surface or plate 46 includes a plurality of through-holes, such as 48a and 48b, extending therethrough such that fastening means (not shown) for mounting the mirror tilt mechanism 30 to the wall surface 52 may be inserted therethrough. As a result thereof, the rear surface 50 of the mounting surface 44 can be mounted flush against and adjacent to the wall surface 32.

Figure 7:
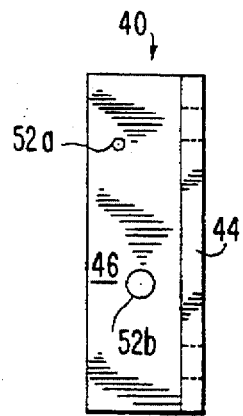
FIG. 7 is a side elevational view of the bracket member of the mirror tilt mechanism of FIG. 3.

The second extension member 46 includes two bores or openings 52a and 52b (see FIG. 7). The first bore 52a permits a pin member 54, such as a cap screw, to extend therethrough. The second bore 52b permits a pivot screw 56 to be inserted therethrough which is matingly engaged therewith.

Figure 11:
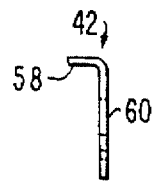
FIG. 11 is a top plan view of the arm member of the mirror tilt mechanism of FIG. 3.

The arm member 42 is also generally L-shaped and includes a first generally vertically elongated member 58 and a second generally elongated member 60 extending inwardly from the first elongated member 58 at approximately a right angle thereto (see FIG. 11). When the mirror tilt mechanism is mounted to the wall surface 32 and the mirror assembly is positioned in a generally vertical orientation with respect to the vertical axis of the wall surface, the rear surface 62 of the first vertical elongate member 58 of the arm member 42 is positioned adjacent to and aligned with the wall surface 52 as well as with the rear surface 50 of the mounting plate 44 of the bracket member 40.

As is best shown in FIGS. 3 through 5 and 9, the arm member 42 also includes a generally circular opening 64 provided in the second elongated member which provides an enclosure to be discussed in more detail below for the pin member 54. A second opening 66 is also provided in the second elongate member 60 of the arm member 42 which engages the pivot screw 56 which is matingly inserted therethrough and matingly engaged therewith. The second vertically elongated member 60 of the arm member 42 also includes a slot 70 at the upper end 72 thereof which reliably receives and retains the upper horizontal support member 18 of the mirror assembly (see FIGS. 2 and 9).

As a result of the pivot pin 56 matingly engaging both the bracket member 40 and the arm member 42 of the mirror tilt mechanism of the present invention, the arm member 42 is pivotally mounted to the bracket member 40 such that when the mirror tilt mechanism 30 is properly mounted to the wall surface 32 and the slot member 70 engages the upper horizontal extension member 18 of the mirror assembly, the arm member is pivotally movable between a first position, wherein the mirror assembly is supported in a generally vertical orientation with respect to the vertical axis b—b to the wall surface 32, and a second position, wherein the mirror assembly is supported at the predetermined angle α with respect to the vertical axis b—b of the wall surface 32 such that the mirror is angled generally downwardly. In order to reduce friction which would be inherent as a result of the pivotal movement of the arm member 42 with respect to the bracket member 40, a plastic friction disc 74 is provided in the space 76 between the bracket member 40 and the arm member 42 which surrounds the pivot screw 56 such that the arm member 42 does not contact the bracket member 40 during pivotal movement thereof. A Bellville washer 78 also surrounds the pivot screw 56 adjacent to the facing surface 80 of the second elongate member 60 of the arm member 42.

In accordance with another general object of the present invention, the mirror tilt mechanism 30 of the present invention also includes a pivot limiting member for limiting pivotal movement and of the arm member 42 between the first and second positions described above and for retaining the arm member in those first and second positions. As aforementioned, as a result of the construction of this mirror tilt mechanism 30, the pin member 54 inserted through opening 52a of the second extending surface 46 of the bracket member 40 also passes through the generally circular opening 64 of the second vertical elongated member 60 of the arm member 42. As is best shown in FIG. 5, the generally circular opening 64 has a first stop surface 82, which restricts further rearward pivotal movement of the arm member in the direction of arrow B when the pin member 54 impinges thereupon to thereby retain the arm member 42 in its first position, and a second stop surface 84, which restricts further forward movement of the arm member in the direction of arrow C when the pin member 54 impinges thereupon to retain the arm member in its second position at a predetermined angle α with respect to the vertical axis b—b of the wall surface 32. As a result thereof, the pivotal movement of the arm member is constrained between its first and second positions as a direct consequence of the first and second stop surfaces 82 and 84, and thus, pivotal movement of the mirror assembly is confined between a position wherein the mirror assembly is supported in a generally vertical orientation with respect to the vertical axis b—b of the wall surface 32 and a position wherein the mirror assembly is supported at the predetermined angle α with respect to the vertical axis b—b of the wall surface 32 such that the mirror is angled downwardly.

As is best shown in FIGS. 1 and 2, the flange support member 34 includes generally three surfaces: a vertical mounting surface 90, a horizontal support surface 92 extending outwardly from the vertical mounting surface 90, and a vertical support member 94 extending upwardly from the horizontal support member 92. A plurality of through-holes 96a, b, c, and d are provided in the mounting surface 90 such that the flange support member 34 may be mounted to the wall surface 32. As is best shown, in FIG. 2, the lower horizontal support member 20 of the mirror assembly is confined in the space 98 provided between the wall surface 32 and the horizontal extending member 92 and vertical extending member 94 of the flange support member 34. As a result of this design, the flange support member 34 provides support for the lower horizontal support member 22 when the arm member 42 of the mirror tilt mechanism 30 is pivotally moved between its first and second positions.

Based upon the foregoing, it will be appreciated that a mirror tilt mechanism has been designed which permits the mirror assembly to be supported at a generally downwardly disposed angle to the vertical axis of the wall surface to which it is mounted upon a relatively minor force being applied to the bottom portion of the mirror assembly. Further, this mirror tilt mechanism also restricts forward and rearward pivotal movement of the mirror assembly and reliably retains the mirror assembly in those positions. Further, this mirror tilting mechanism provides a mirror assembly which is "accessible" for use by handicapped individuals.

While the present invention has been particularly shown and described with reference to a preferred embodiment, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A mirror tilt mechanism for tilting a mirror of a mirror assembly to a predetermined angle with respect to a vertical axis of a wall surface, said mirror tilt mechanism comprising:

a bracket member for mounting the mirror tilt mechanism to the wall surface;

an arm member for engaging a support member of the mirror assembly to be tilted and pivotally mounted to said bracket member such that said arm member is pivotally movable between a first position, wherein the mirror of the mirror assembly is supported in a generally vertical orientation with respect to the vertical axis of the wall surface, and a second position, wherein the mirror of the mirror assembly is supported at the predetermined angle with respect to the vertical axis of the wall surface such that the mirror is angled generally downwardly; and pivot limiting means for limiting pivotal movement of said arm means between said first and second positions wherein said pivot limiting means includes a pin member extending from said bracket member which passes through enclosure means provided in said arm member for limiting movement of said pin member such that movement of said arm member is constrained between said first and second positions.

2. The mirror tilt mechanism of claim 1 wherein said bracket means includes a vertically extending mounting plate having a plurality of through-holes extending therethrough such that fastening members for mounting said bracket means to the wall surface can be inserted therethrough.

3. The mirror tilt mechanism of claim 1 and further including a pivot screw member matingly engaging screw openings provided in said arm member and said bracket member to pivotally move said arm member with respect to said bracket member and provide a space between said arm member and said bracket member which is provided with a plastic friction disc surrounding said pivot screw member such that said arm member does not contact said bracket member during pivotal movement thereof.

4. The mirror tilt mechanism of claim 1 wherein said arm member includes a slot member for reliably receiving and supporting a support member of the mirror assembly to be tilted.

5. The mirror tilt mechanism of claim 1 wherein said enclosure means is a generally circular opening provided in said arm members having a first stop surface, which restricts further rearward movement of said arm members when said pin members impinges thereupon to thereby retain said arm members in said first position, and a second stop surface, which restricts further forward movement of said arm member when said pin member impinges thereupon to thereby retain said arm member in said second position.

6. The mirror tilt mechanism of claim 1 wherein said pin member is a cap screw.

7. A mirror tilt mechanism for tilting a mirror of a mirror assembly to a predetermined angle with respect to a vertical axis of a wall surface, said mirror tilt mechanism comprising:

a bracket member for mounting the mirror tilt mechanism to the wall surface;

an arm member for engaging a support member of the mirror assembly to be tilted and being pivotally mounted to said bracket member such that said arm member is pivotally movable between a first position, wherein the mirror of the mirror assembly is supported in a generally vertical orientation with respect to the vertical axis of the wall surface, and a second position, wherein the mirror of the mirror assembly is supported at the predetermined angle with respect to the vertical axis of the wall surface such that the mirror is angled generally downwardly; and pivot limiting means for limiting pivotal movement of said arm member between said first and second positions, said pivot limiting means including a pin member extending from said bracket member which passes through enclosure means provided in said arm member for limiting movement of said pin member such that movement of said arm member is constrained between said first and second positions, wherein said enclosure means is a generally circular opening provided in said arm member having a first stop surface, which restricts further rearward movement of said arm member when said pin member impinges thereupon to thereby retain said arm member in said first position, and a second stop surface, which restricts further forward movement of said arm member when said pin member impinges thereupon to thereby retain said arm member in said second position.

8. The mirror tilt mechanism of claim 7 wherein said pin member is a cap screw.

9. The mirror tilt mechanism of claim 7 wherein said arm member includes slot means for reliably receiving and supporting support member of the mirror assembly to be tilted.

10. An assembly for tilting a mirror to a predetermined angle with respect to a vertical axis of a wall surface, said tilting assembly comprising:

a mirror assembly including the mirror to be tilted and at least two vertical support members interconnected by upper and lower horizontal support members which support the mirror;

a mirror tilt mechanism including a bracket member means for mounting the mirror tilt mechanism to a wall surface, and an arm member for engaging the upper horizontal support member of said mirror assembly and being pivotally mounted to said bracket member such that said arm member is pivotally movable between a first position, wherein the mirror is supported in a generally vertical orientation with respect to the vertical axis of the wall surface, and a second position, wherein the mirror is supported at the predetermined angle with respect to the vertical awls of the wall surface such that the mirror is angled generally downwardly;

a flange support member for supporting said lower horizontal support member of said mirror assembly to the wall surface; and pivot limiting means for limiting pivotal movement of said arm member between said first and second positions.

11. The assembly for tilting a mirror assembly to a predetermined angle of claim 10 wherein said pivot limiting means includes a pin member extending from said bracket member which passes through enclosure means provided in said arm member for limiting movement of said pin member such that pivotal movement of said arm member is constrained between said first and second positions.

12. The assembly for tilting a mirror assembly to a predetermined angle of claim 11 wherein said enclosure means is a generally circular opening provided in said arm member having a first stop surface, which restricts further rearward movement of said arm means when said pin member impinges thereupon to thereby retain said arm member in said first position, and a second stop surface, which restricts further forward movement of said arm means when said pin member impinges thereupon to thereby retain said arm member in said second position.

13. The assembly for tilting a mirror assembly to a predetermined angle of claim 10 wherein said arm member includes a slot member for reliably receiving and supporting said upper horizontal support member of said mirror assembly.

* * * * *